(12) United States Patent
Yu (10) Patent No.: US 12,172,796 B2
(45) Date of Patent: Dec. 24, 2024

(54) LIGHTWEIGHT AND LARGE-CAPACITY GARAGE KIT CARRYING CASE

(71) Applicant: Zheng Yu, Shenzhen (CN)

(72) Inventor: Zheng Yu, Shenzhen (CN)

( * ) Notice: Subject to any disclaimer, the term of this patent is extended or adjusted under 35 U.S.C. 154(b) by 77 days.

(21) Appl. No.: 18/331,041

(22) Filed: Jun. 7, 2023

(65) Prior Publication Data
US 2024/0375818 A1    Nov. 14, 2024

(30) Foreign Application Priority Data
May 11, 2023   (CN) .......................... 202321122945.1

(51) Int. Cl.
| | | |
|---|---|---|
| *B65D 25/28* | (2006.01) | |
| *B65D 1/34* | (2006.01) | |
| *B65D 6/10* | (2006.01) | |
| *B65D 6/24* | (2006.01) | |
| *B65D 6/34* | (2006.01) | |
| *B65D 25/10* | (2006.01) | |
| *B65D 43/16* | (2006.01) | |

(52) U.S. Cl.
CPC ................ *B65D 11/16* (2013.01); *B65D 1/34* (2013.01); *B65D 11/1873* (2013.01); *B65D 11/22* (2013.01); *B65D 25/107* (2013.01); *B65D 25/2858* (2013.01); *B65D 43/16* (2013.01); *B65D 2251/1016* (2013.01); *B65D 2543/00194* (2013.01); *B65D 2543/00296* (2013.01)

(58) Field of Classification Search
CPC ......... B65D 11/16; B65D 11/22; B65D 11/24; B65D 25/107; B65D 25/2858; B65D 2251/1016
See application file for complete search history.

(56) References Cited

FOREIGN PATENT DOCUMENTS

| | | |
|---|---|---|
| CN | 113940506 A | 1/2022 |
| CN | 215423805 U | 1/2022 |
| CN | 217944904 U | 12/2022 |

*Primary Examiner* — Don M Anderson
(74) *Attorney, Agent, or Firm* — Nitin Kaushik (57) ABSTRACT

The present invention discloses a lightweight and large-capacity garage kit carrying case, including a case body provided with a case opening door on a circumferential surface thereof. The case body is formed by splicing a plurality of double-layer plastic panels with hollow interiors; a plurality of small bumps are correspondingly formed side by side on opposite surfaces of the plastic panels, located on two sides of the case opening door, of the case body; a cargo chute is formed between two adjacent rows of upper and lower small bumps; and a tray capable of being pulled along a direction of the case opening door is erected between two cargo chutes arranged symmetrically. The case features light weight, high strength, large capacity, and high space utilization, making it convenient to carry a large number of garage kit models for board games.

10 Claims, 8 Drawing Sheets

LIGHTWEIGHT AND LARGE-CAPACITY GARAGE KIT CARRYING CASE

CROSS-REFERENCE TO RELATED APPLICATIONS

The application claims priority to Chinese patent application No. 202321122945.1, filed on May 11, 2023, the entire contents of which are incorporated herein by reference.

TECHNICAL FIELD

The present invention relates to a storage type carrying case, in particular to a lightweight and large-capacity garage kit carrying case.

BACKGROUND

Garage kit model cases used by Wargame board game players are mainly used for the board game players to carry garage kit models for board games. In the prior art, a conventional carrying tool is a case with a deformable soft cushion layer (such as a sponge cushion layer and an airbag cushion layer) inside, and each garage kit model is placed independently in an independent space separated by the soft cushion layer. Such carrying tool can well protect the garage kit models through the separation of the soft cushion layer to prevent collisions during carrying of the garage kit models. However, the entire case has low internal space utilization, making it inconvenient to carry a large number of garage kit models.

SUMMARY

To solve the above technical problem, the present invention provides a lightweight and large-capacity garage kit carrying case. The case features light weight, high strength, large capacity, and high space utilization, making it convenient to carry a large number of garage kit models for board games.

The present invention adopts the following technical solution:

A lightweight and large-capacity garage kit carrying case includes a case body provided with a case opening door on a circumferential surface thereof, where the case body is formed by splicing a plurality of double-layer plastic panels with hollow interiors, a plurality of small bumps are correspondingly formed side by side on opposite surfaces of the plastic panels, located on two sides of the case opening door, of the case body, a cargo chute is formed between two adjacent rows of upper and lower small bumps, and a tray capable of being pulled along a direction of the case opening door is erected between two cargo chutes arranged symmetrically; and a plurality of reinforcing grooves are formed on an inner side surface of each of the double-layer plastic panels constituting the case body, and the plurality of reinforcing grooves are staggered at intervals.

Further,
the reinforcing grooves are of a long strip waist-shaped structure, and the reinforcing grooves are arranged in a same direction on a same one of the double-layer plastic panels.

Further,
an angle is formed between an arrangement direction of the plurality of reinforcing grooves on the opposite surfaces of the plastic panels located on the two sides of the case opening door and a length direction of the cargo chutes.

Further,
a height of the plurality of small bumps in a vertical direction is 1-2 cm, and a height of each row of small bumps is consistent; and a width of the cargo chutes is 0.2-0.8 cm.

Further,
the tray is of a disk-shaped structure capable of being attracted by a magnetic material and matched in shape with a cross section of the case body.

Further,
the case body is of a square box-shaped structure, the square box-shaped structure includes a left side panel and a right side panel arranged opposite to each other, a rear panel is assembled in an inserted manner at a rear end between the left and right side panels, a top panel is detachably and fixedly connected to tops of the left and right side panels, a bottom panel is detachably and fixedly connected to bottoms of the left and right side panels, a front small door opening panel is rotatably connected to a front end of the left side panel, a front large door opening panel is rotatably connected to a front end of the right side panel, and the front small and large door opening panels are buckled to form the case opening door.

Further,
pre-embedded nuts for detachably fixing the top panel and the bottom panel are pre-embedded in tops and bottoms of the left side panel and the right side panel, respectively, and the top panel and the bottom panel are in threaded connection with the pre-embedded nuts by threaded connecting pieces, respectively.

Further,
bump-shaped limit strips are formed on two opposite inner side surfaces of the top panel and the bottom panel, respectively, and the limit strips correspondingly stop at tops and bottoms of inner side surfaces of the front large door opening panel and the front small door opening panel, respectively.

Further,
clamp head grooves are formed on top end surfaces and bottom end surfaces of the front small door opening panel and the front large door opening panel, respectively; bulge-shaped raised clamp heads are formed in positions, corresponding to the clamp head grooves, of the top panel and the bottom panel, respectively; and the raised clamp heads are capable of being elastically clamped into the corresponding clamp head grooves and limited in the clamp head grooves.

Further,
a handle is arranged at a top of the case body in a positioned manner and includes a grip portion and rotating portions formed at two ends of the grip portion; a groove is formed in each of positions, corresponding to the two rotating portions, of the top of the case body; and a corresponding one of the rotating portions penetrates through and is rotatably connected and limited to a side wall of the groove.

The present invention has the following beneficial technical effects:

1. In view of the portability of the garage kit carrying case, the panels of the case body are all the double-layer plastic panels with the hollow interiors; and in view of the firmness of the case, a large number of the small bumps are formed on the opposite surfaces of the plastic panels, located on the two sides of the case opening door, of the case body, and the reinforcing grooves are arranged at intervals on the inner side surfaces of the plastic panels of the case body. The arrangement of these small bumps and reinforcing grooves can increase the strength of the plastic panels under the premise of ensuring the light weight of the case body as a whole, thereby avoiding the problem of recess deformation of the flat plastic panels under stress.

2. In the case body, the small bumps are directly used to form the cargo chutes for supporting the tray and allowing the tray to be pulled. By adjusting the height of the small bumps and the width of the cargo chutes, the height of the tray in the case can be finely adjusted to adapt to garage kit models with different heights and avoid waste of space in the case, thus improving the space utilization of the case.

In the drawings:
100—case body; 200—tray;
1—left side panel; 2—right side panel; 3—top panel; 4—bottom panel; 5—rear panel; 6—front large door opening panel; 7—front small door opening panel; 8—small bump; 9—cargo chute; 10—reinforcing groove; 11—handle;
101—slot; 102—groove;
301—pre-embedded nut; 302—threaded connecting piece; 303—rotary shaft groove; 304—limit strip; 305—raised clamp head;
501—insertion portion;
601—rotary shaft; 602—transparent window; 603—clamp head groove;
1101—grip portion; and 1102—rotating portion.

DETAILED DESCRIPTION OF THE EMBODIMENTS

To more clearly understand the technical means of the present invention and to implement it according to the content of the specification, the specific implementation of the present invention will be further described in detail in conjunction with the accompanying drawings and the embodiment. The embodiment below is used to illustrate the present invention, but not to limit the scope of the present invention.

This embodiment provides a detailed description of a lightweight and large-capacity garage kit carrying case. The case may be of a box-shaped structure with a hollow interior and an arbitrary shape. In this specific embodiment, a square box-shaped structure is used as an example for explanation.

The lightweight and large-capacity garage kit carrying case includes a case body 100 provided with a case opening door on a circumferential surface thereof. The case body is formed by splicing a plurality of double-layer plastic panels with hollow interiors, where the double-layer plastic panels may be formed by means of blow molding. In this specific embodiment, the case body 100 includes seven double-layer plastic panels, which are a left side panel 1, a right side panel 2, a top panel 3, a bottom panel 4, a rear panel 5, a front large door opening panel 6, and a front small door opening panel 7, respectively; and the seven panels together form six surfaces of the square case.

Figure 4:
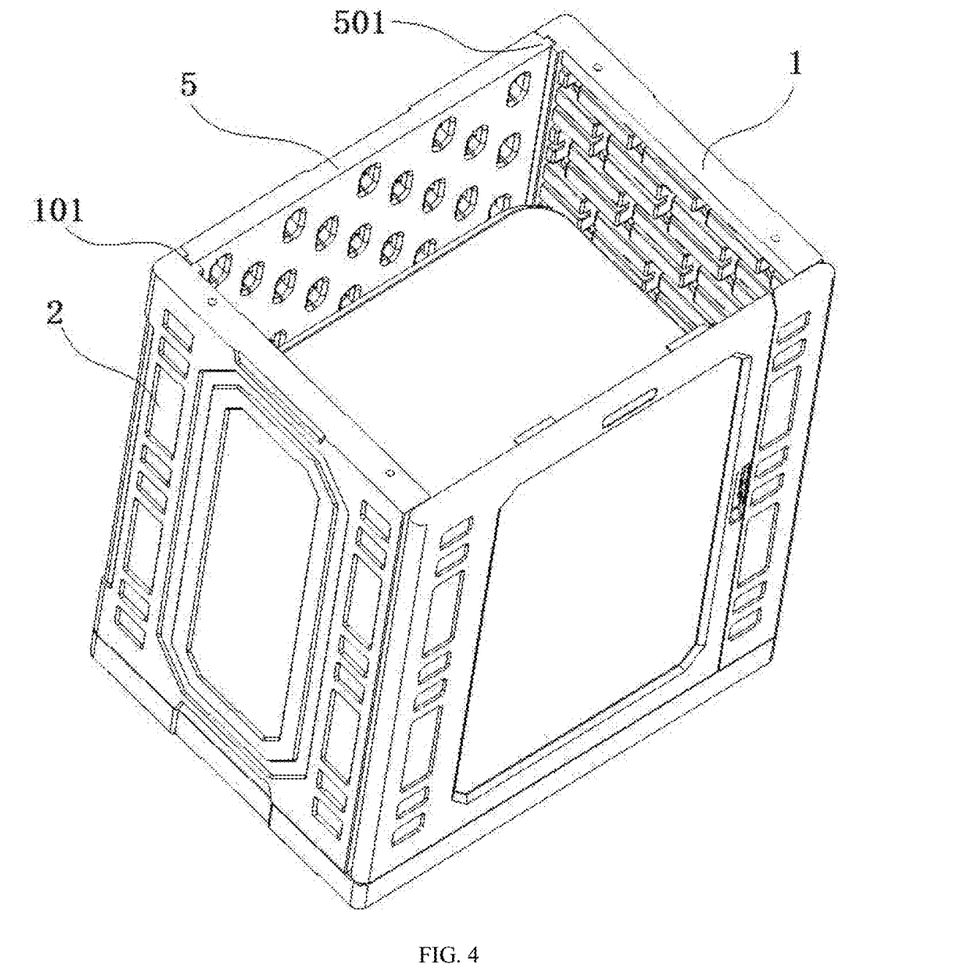
FIG. 4 is a schematic diagram (no display of a top panel) of a connection relationship between a rear panel and left and right side panels in the present invention.

The left side panel 1 and the right side panel 2 are arranged opposite to each other, and the rear panel 5 is assembled in an inserted manner at a rear end between the left side panel 1 and the right side panel 2. A specific structure may be that slots 101 arranged correspondingly are provided on rear side surfaces of the left and right side panels, and insertion portions 501 matched with the slots are formed on two sides of the rear panel 5. The insertion portions are assembled in an inserted manner in the slots, so that the left side panel 1 and the right side panel 2 can be assembled together using the rear panel 5.

Figure 3:
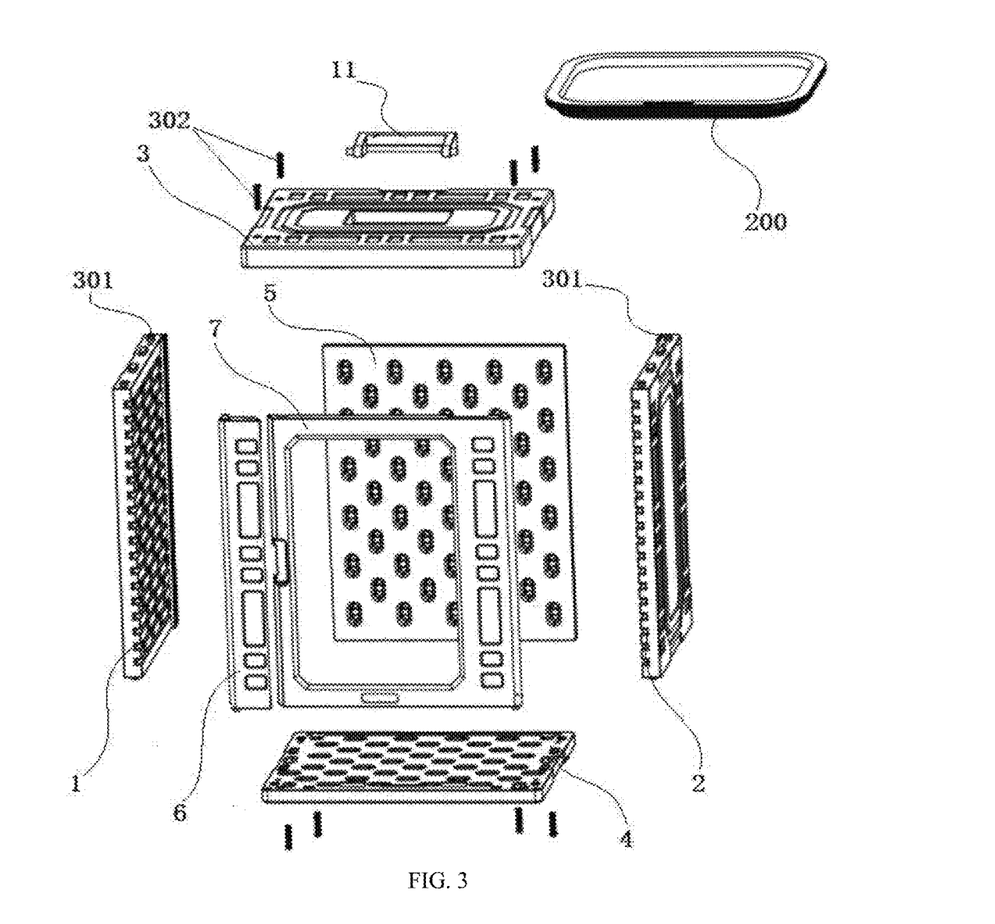
FIG. 3 is an exploded view of an overall mechanism of the present invention.

The top panel 3 is detachably and fixedly connected to tops of the left side panel 1 and the right side panel 2, and the bottom panel 4 is detachably and fixedly connected to bottoms of the left side panel and the right side panel. A specific structure of detachable and fixed connection is as follows: pre-embedded nuts 301 for detachably fixing the top panel 3 and the bottom panel 4 are pre-embedded in top and bottom end surfaces of the left side panel 1 and the right side panel 2, respectively, pre-embedding positions may be four corners of the corresponding top panel 3 or bottom panel 4, and the pre-embedded nuts may also be linearly arranged along cross sections of the left side panel 1 and the right side panel 2 as a whole; and through holes are provided in positions, corresponding to the pre-embedded nuts 301, of the top panel 3 and the bottom panel 4, and threaded connecting pieces 302 (such as bolts) may be used to penetrate through the through holes and to be in threaded connection with the pre-embedded nuts, so that the top panel 3 and the bottom panel 4 are fixedly connected to a top and a bottom, respectively. The use of the pre-embedded nuts achieves the better firmness and the difficulty in falling compared with a conventional way of reserving threaded holes on plastic panels and performing connection through the threaded holes.

Figure 5:
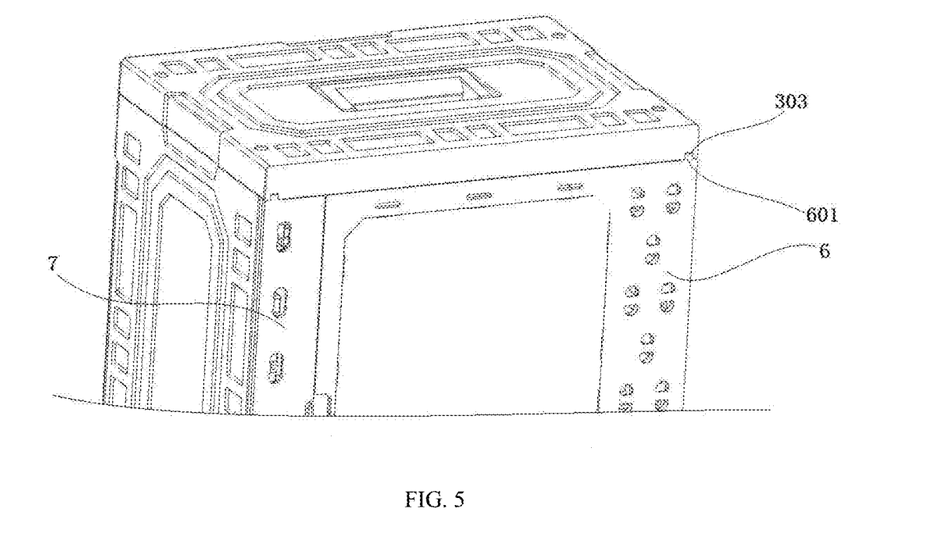
FIG. 5 is a schematic structural diagram (only display of part of a front large door opening panel and a front small door opening panel) of rotatable connection between the front large door opening panel and the front small door opening panel in the present invention.

The front small door opening panel 7 is rotatably connected to a front end of the left side panel 1, the front large door opening panel 6 is rotatably connected to a front end of the right side panel 2, and the front small and large door opening panels are buckled to form the aforementioned case opening door. A specific structure of rotatable connection may be as follows: raised rotary shafts 601 (the rotary shafts 601 may be integrally formed with the front small and large door opening panels or may be formed separately, and an integrally formed structure is used in this specific embodiment) are formed on top end surfaces and bottom end surfaces of the front small door opening panel 6 and the front large door opening panel 7, rotary shaft grooves 303 are formed in positions, corresponding to the rotary shafts 601, of the top panel 3 and the bottom panel 4, and the rotary shafts are arranged in the rotary shaft grooves in an axially limited manner, so that the front small and large door opening panels can rotate around the rotary shafts to implement door opening and closing. During use, the front large door opening panel and the front small door opening panel can be opened towards two sides; and a transparent window 602 is arranged on the front large door opening panel, making it convenient to observe a situation in the case.

In addition, a bump-shaped limit strip 304 is formed on each of two opposite inner side surfaces, corresponding to inner side surfaces of the front small door opening panel 6 and the front large door opening panel 7, of the top panel 3 and the bottom panel 4, and the limit strips correspondingly stop at tops and bottoms of the inner side surfaces of the two door opening panels, so that the two door opening panels cannot rotate towards the inside of the case along the rotary shafts 601 thereof, thus avoiding the recess of the door opening panels due to excessive force when the case is closed by a user. One side, close to the inner side surface of the door opening panel, of a bump-shaped structure of the aforementioned limit strip 304 is matched in shape with the inner side surface of the door opening panel. For example, in this specific embodiment, if the inner side surface of the door opening panel is a vertical plane, the corresponding surface of the limit strip is also a vertical plane.

Figure 8:
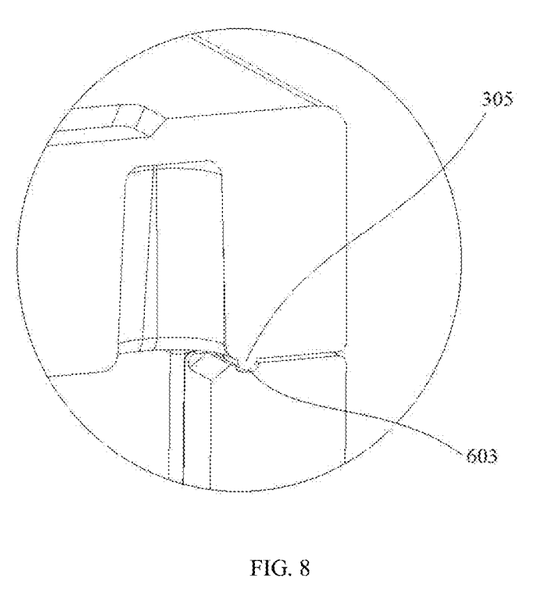
FIG. 8 is an enlarged view of a portion A in FIG. 7, that is, a schematic structural diagram of cooperation between a raised clamp head and a clamp head groove.

Meanwhile, bulge-shaped raised clamp heads 305 are formed on two opposite inner side surfaces, corresponding to the top end surfaces and the bottom end surfaces of the front small door opening panel and the front large door opening panel, of the top panel 3 and the bottom panel 4, respectively; matched recess-shaped clamp head grooves 603 are formed in positions, corresponding to the raised clamp heads 305, of the top end surfaces and the bottom end surfaces of the two door opening panels; and when the two door opening panels of the case opening door are closed, the raised clamp heads 305 enter the clamp head grooves 603 and are limited in the clamp head grooves, so that the door opening panels can be closed tightly and positioned there. In this way, the door opening panels will not be opened due to shaking when the case is carried to move. In this specific embodiment, the raised clamp heads 305 are of a strip-shaped structure, and a radial cross section of the strip-shaped structure is semi-circular, that is, outer surfaces of the raised clamp heads are circular arc surfaces; the corresponding clamp head grooves 603 are strip-shaped grooves corresponding to the raised clamp heads, radial sections of the strip-shaped grooves are of a bowl-shaped structure matched with the raised clamp heads, and a bottom of the bowl-shaped structure is a plane and two sides thereof extend upwards along two sides of the plane to form a concave surface; and a depth of the clamp head grooves is not less than a height of the raised clamp heads. In this way, when the panels are pushed to the raised clamp heads, the raised clamp heads can smoothly enter the clamp head grooves by using the elasticity of plastic parts and circular arc surface structures; and when the case is carried to move, the raised clamp heads 305 are not prone to sliding out of the clamp head grooves 603, thus implementing the positioning of the door opening panels.

In addition, in this specific embodiment, two raised clamp heads 305 are arranged on the bottom panel or the top panel, correspond to the front large door opening panel 6 and the front small door opening panel 7, respectively, and are symmetrically distributed on the bottom panel 3 or the top panel 4. In this way, if the user has requirements for a direction of opening the case opening door, the front large door opening panel and the front small door opening panel of the case can be arbitrarily exchanged during assembly, while the raised clamp heads and the corresponding clamp head grooves can play a corresponding role.

A plurality of small bumps 8 are correspondingly formed side by side on opposite surfaces of the plastic panels, located on two sides of the case opening door, of the case body 100, a cargo chute 9 is formed between two adjacent rows of upper and lower small bumps, and a tray 200 capable of being pulled along a direction of the case opening door is erected between two cargo chutes arranged symmetrically. In this specific embodiment, the small bumps 8 are of a long strip-shaped structure, and a length direction of the small bumps of the long strip-shaped structure is set along a pulling direction of the tray 200; and the small bumps are specifically arranged on two opposite inner side surfaces of the left side panel 1 and the right side panel 2 based on a condition that the small bumps can exactly spread over the entire inner side surfaces. The aforementioned small bumps may be arranged in upper and lower rows forming a group or may be arranged in a single row; and in addition, a length of the small bumps may be equal to or less than a width (i.e. along the pulling direction of the tray) of the left side panel 1 or the right side panel 2.

A height of the plurality of small bumps 8 in a vertical direction is 1-2 cm, optimally 1 cm, and a height of each row of small bumps is consistent; a width of the cargo chutes 9 is 0.2-0.8 cm, optimally 0.5 cm; and through the design of the height of the small bumps 8 and the width of the cargo chutes 9, the height of the tray 200 in the case can be finely adjusted to adapt to garage kit models with different heights and avoid waste of space in the case.

In addition, due to the consideration of the portability, the seven panels constituting the case body 100 are all the double-layer plastic panels with the hollow interiors, so that there is a situation of low strength. To solve the technical problem and improve the firmness of the case, in addition to the arrangement of the small bumps 8 on the two opposite inner side surfaces of the left side panel 1 and the right side panel 2 to increase the strength of the plastic panels, a plurality of reinforcing grooves 10 staggered at intervals may be formed on the inner side surface of each double-layer plastic panel constituting the case body 100. In this specific embodiment, the reinforcing grooves 10 are of a long strip waist-shaped structure, and the reinforcing grooves are arranged in a same direction on a same double-layer plastic panel. For example, a length direction of the reinforcing grooves 10 on the inner side surfaces of the top panel 3 and the bottom panel 4 is consistent with a length direction of the panels; a length direction of the reinforcing grooves 10 on the inner side surfaces of the rear panel 5 and the front large door opening panel 6 is set along a vertical direction; a direction of the reinforcing grooves 10 on the inner side surface of the front small door opening panel 7 is consistent with a width direction of the front small door opening panel; and an angle is formed between an arrangement direction of the plurality of reinforcing grooves 10 on the opposite surfaces (i.e. on the inner side surfaces of the left side panel 1 and the right side panel 2) of the plastic panels located on two sides of the case opening door and a length direction of the cargo chutes 9, and the angle is preferably 90°, that is, the length direction of the reinforcing grooves 10 of the long strip waist-shaped structure is perpendicular to the length direction of the cargo chutes 9. The arrangement and arrangement manner of the above small bumps 8 and reinforcing grooves 10 can increase the strength of the plastic panels, thereby avoiding the problem of recess deformation of the flat plastic panels under stress.

Figure 1:
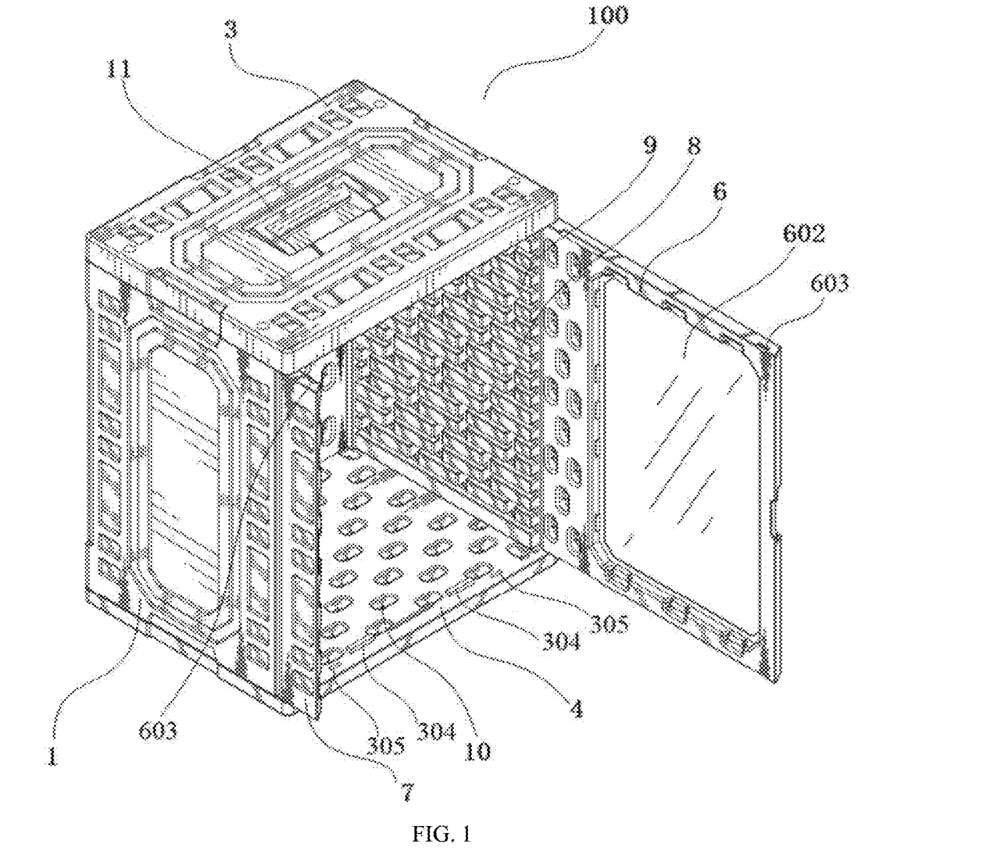
FIG. 1 is a first schematic three-dimensional structural diagram (an open state of a case opening door) of the present invention.
Figure 2:
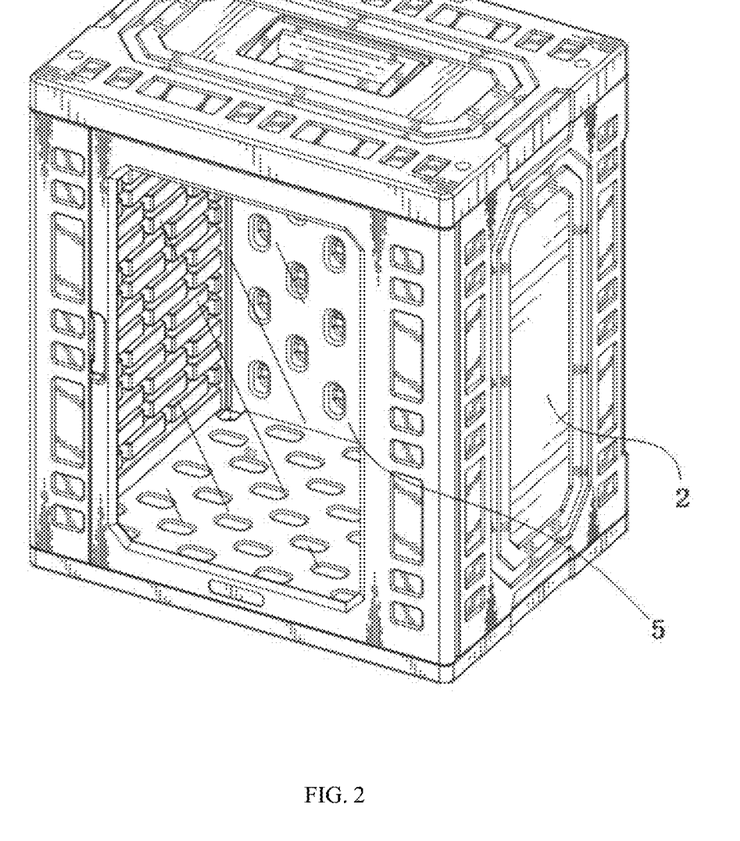
FIG. 2 is a second schematic three-dimensional structural diagram (a closed state of a case opening door) of the present invention.

Moreover, in this specific embodiment, the small bumps are arranged in a manner that the small bumps are shorter than the side panels in the width direction and upper and lower rows form a group. As shown in FIG. 1, the small bumps in left and right adjacent groups are separated by the reinforcing grooves 10. Such arrangement manner uses the arrangement of the reinforcing grooves 10 to separate the small bumps arranged along the width direction of the side panels as a whole, which can more effectively avoid the deformation of the panels under stress.

Figure 6:
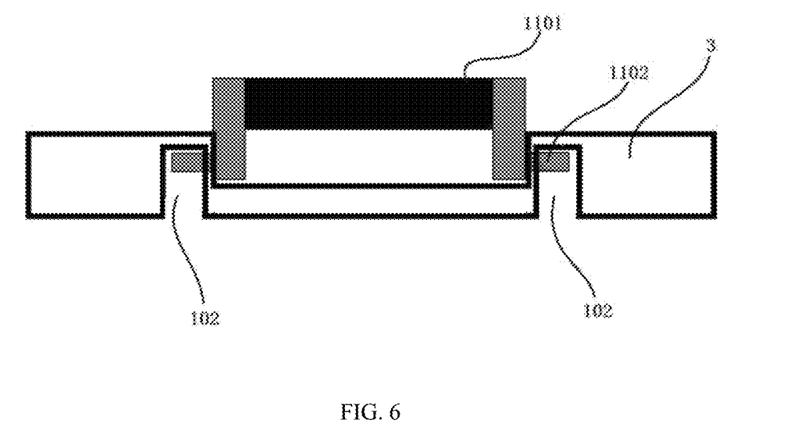
FIG. 6 is a schematic structural diagram of combination of atop cover and a handle in the present invention.
Figure 7:
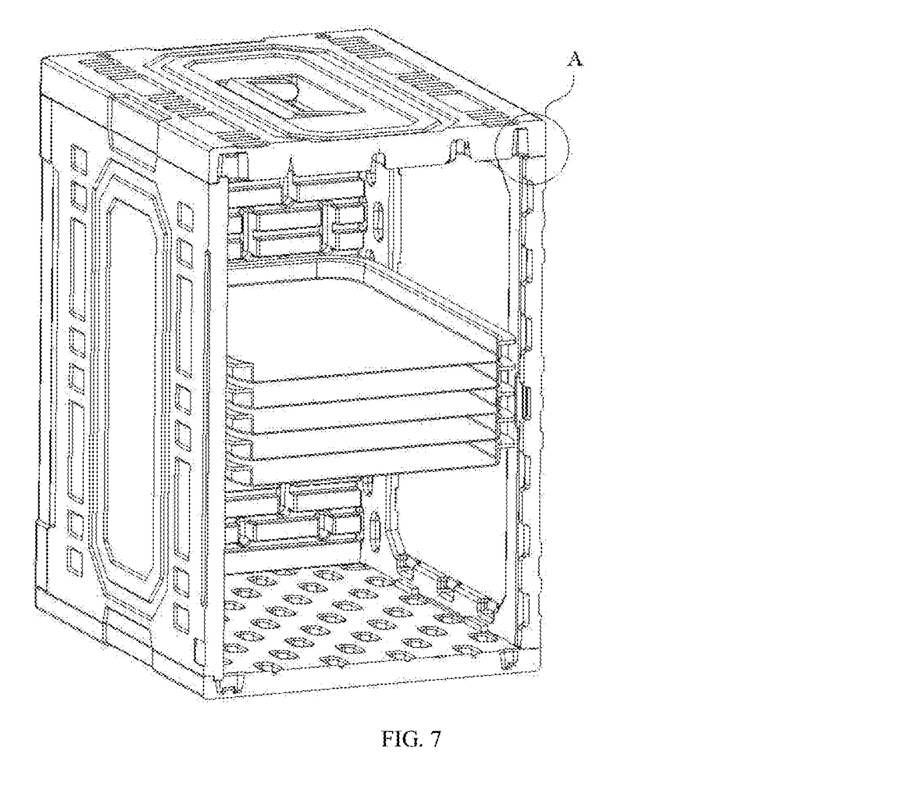
FIG. 7 is a schematic side view of an internal structure of the present invention.

A handle 11 capable of movably rotating is arranged at a top of the case body 100 in a positioned manner. The handle 11 includes a grip portion 1101 and rotating portions 1102 formed at two ends of the grip portion; and a groove 102 is formed in each of positions, corresponding to the two rotating portions 1102, of an inner side surface of the top of the case body 100, and a corresponding one of the two rotating portions 1102 penetrates through and is rotatably connected and limited to a side wall of the groove 102. In this specific embodiment, the reinforcing grooves arranged on the inner side surface of the top panel may be used as the grooves for positioning the rotating portions of the handle. In this way, during positioning of the rotating portions of the handle, the rotating portions first penetrate through side walls of the grooves, and parts, penetrating through the side walls of the grooves, of the rotating portions get close to bottoms of the grooves. Compared with a structure in the prior art that the rotating portions of the handle are arranged in hollow cavities in middles of the double-layer plastic panels and only supported by single-layer plastic panels, the rotation portions penetrate through the double-layer plastic panels when penetrating through the side walls of the grooves, so that two stress positions can be added; and due to the arrangement of the grooves, the plastic panels located above the rotating portions are located on two sides, and the total thickness can be doubled, so that the bearing capacity of the handle can be improved.

The number of trays 200 in the present application may be set according to heights of garage kits and space separation. In this specific embodiment, there are five trays, which are independently and movably arranged in the cargo chutes 9. The trays 200 are of a disk-shaped structure capable of being attracted by a magnetic material and matched in shape with a cross section of the case body. The trays may be formed from pure metal materials or mixed materials formed by adding metal powder capable of being attracted by magnetic materials into plastic products. When the trays 200 are used in cooperation with garage kit models, magnetic blocks may generally be added below the garage kit models, so that the garage kit models can be firmly magnetically sucked on the trays when placed on the trays, thereby preventing the movement and collision between the garage kit models during carrying of the case.

The above description is only the preferred implementation of the present invention and is not used to limit the present invention. It should be pointed out that several improvements and modifications can be made by those of ordinary skill in the art without departing from the technical principle of the present invention, and these improvements and modifications are also regarded as the scope of protection of the present invention.

What is claimed is:

1. A lightweight and large-capacity garage kit carrying case, comprising a case body provided with a case opening door on a circumferential surface thereof, wherein
    the case body is formed by splicing a plurality of double-layer plastic panels with hollow interiors, a plurality of small bumps are correspondingly formed side by side on opposite surfaces of the plastic panels, located on two sides of the case opening door, of the case body, a cargo chute is formed between two adjacent rows of upper and lower small bumps, and a tray capable of being pulled along a direction of the case opening door is erected between two cargo chutes arranged symmetrically; and
    a plurality of reinforcing grooves are formed on an inner side surface of each of the double-layer plastic panels constituting the case body, and the plurality of reinforcing grooves are staggered at intervals.

2. The lightweight and large-capacity garage kit carrying case according to claim 1, wherein the reinforcing grooves are of a long strip waist-shaped structure, and the reinforcing grooves are arranged in a same direction on a same one of the double-layer plastic panels.

3. The lightweight and large-capacity garage kit carrying case according to claim 2, wherein an angle is formed between an arrangement direction of the plurality of reinforcing grooves on the opposite surfaces of the plastic panels located on the two sides of the case opening door and a length direction of the cargo chutes.

4. The lightweight and large-capacity garage kit carrying case according to claim 1, wherein a height of the plurality of small bumps in a vertical direction is 1-2 cm, and a height of each row of small bumps is consistent; and a width of the cargo chutes is 0.2-0.8 cm.

5. The lightweight and large-capacity garage kit carrying case according to claim 1, wherein the tray is of a disk-shaped structure capable of being attracted by a magnetic material and matched in shape with a cross section of the case body.

6. The lightweight and large-capacity garage kit carrying case according to claim 1, wherein the case body is of a square box-shaped structure, the square box-shaped structure comprises a left side panel and a right side panel arranged opposite to each other, a rear panel is assembled in an inserted manner at a rear end between the left and right side panels, a top panel is detachably and fixedly connected to tops of the left and right side panels, a bottom panel is detachably and fixedly connected to bottoms of the left and right side panels, a front small door opening panel is rotatably connected to a front end of the left side panel, a front large door opening panel is rotatably connected to a front end of the right side panel, and the front small and large door opening panels are buckled to form the case opening door.

7. The lightweight and large-capacity garage kit carrying case according to claim 6, wherein pre-embedded nuts for detachably fixing the top panel and the bottom panel are pre-embedded in tops and bottoms of the left side panel and the right side panel, respectively, and the top panel and the bottom panel are in threaded connection with the pre-embedded nuts by threaded connecting pieces, respectively.

8. The lightweight and large-capacity garage kit carrying case according to claim 6, wherein bump-shaped limit strips are formed on two opposite inner side surfaces of the top panel and the bottom panel, respectively, and the limit strips correspondingly stop at tops and bottoms of inner side surfaces of the front large door opening panel and the front small door opening panel, respectively.

9. The lightweight and large-capacity garage kit carrying case according to claim 6, wherein clamp head grooves are formed on top end surfaces and bottom end surfaces of the front small door opening panel and the front large door opening panel, respectively; bulge-shaped raised clamp heads are formed in positions, corresponding to the clamp head grooves, of the top panel and the bottom panel, respectively; and the raised clamp heads are capable of being elastically clamped into the corresponding clamp head grooves and limited in the clamp head grooves.

10. The lightweight and large-capacity garage kit carrying case according to claim 1, wherein a handle is arranged at a top of the case body in a positioned manner and comprises a grip portion and rotating portions formed at two ends of the grip portion; a groove is formed in each of positions, corresponding to the two rotating portions, of the top of the case body; and a corresponding one of the rotating portions penetrates through and is rotatably connected and limited to a side wall of the groove.

* * * * *